(12) United States Patent
Dennert (10) Patent No.: US 9,055,397 B2
(45) Date of Patent: Jun. 9, 2015

(54) METHOD FOR USAGE OF VPLMN INFRASTRUCTURE BY AN HPLMN TO TERMINATE AN IMS SESSION SET UP FOR A ROAMING USER

(75) Inventor: Thomas Dennert, Troisdorf (DE)

(73) Assignee: DEUTSCHE TELEKOM AG, Bonn (DE)

( * ) Notice: Subject to any disclaimer, the term of this patent is extended or adjusted under 35 U.S.C. 154(b) by 150 days.

(21) Appl. No.: 13/704,320

(22) PCT Filed: Jun. 7, 2011

(86) PCT No.: PCT/EP2011/002777
§ 371 (c)(1),
(2), (4) Date: Feb. 26, 2013

(87) PCT Pub. No.: WO2011/157366
PCT Pub. Date: Dec. 22, 2011

(65) Prior Publication Data
US 2013/0201933 A1 Aug. 8, 2013

Related U.S. Application Data

(60) Provisional application No. 61/355,898, filed on Jun. 17, 2010.

(30) Foreign Application Priority Data

Jun. 17, 2010 (EP) .................................... 10006283

(51) Int. Cl.
*H04W 8/02* (2009.01)
*H04W 8/08* (2009.01)
*H04W 36/00* (2009.01)
*H04W 80/10* (2009.01)

(52) U.S. Cl.
CPC ................ *H04W 8/02* (2013.01); *H04W 8/082* (2013.01); *H04W 36/0022* (2013.01); *H04W 80/10* (2013.01)

(58) Field of Classification Search
None
See application file for complete search history.

(56) References Cited

U.S. PATENT DOCUMENTS 8,224,330 B2 * 7/2012 Ahmed ......................... 455/436
2008/0020704 A1 * 1/2008 Costa et al. .................. 455/3.06

(Continued)

OTHER PUBLICATIONS

IP Multimedia Subsystem (IMS), Stage 2, 3GPP TS 23.228 V. 9.3.0 Release 9, Mar. 2010, pp. 48 and 237-239.*

(Continued)

*Primary Examiner* — Donald Mills
(74) *Attorney, Agent, or Firm* — Leydig, Voit & Mayer, Ltd.

(57) ABSTRACT

A method for providing a roaming functionality related to an Internet Protocol Multimedia Subsystem (IMS) session includes: transmitting, by a second IMS domain, a session set-up request control signaling to a first IMS domain; transmitting, by the first IMS domain, the session set-up request control signaling in a forward direction to a Roaming Border Control Function (RBCF); and handling, by the second IMS domain, the user plane path and the associated control signaling to terminate the session set-up. Local break out of media is applied for the roaming first UE. The RBCF provides a linking of signaling received via a loop through the first IMS domain in the Home Public Land Mobile Network (HPLMN) with media anchored due to the local break out in the second IMS domain in the Visited Public Land Mobile Network (VPLMN).

9 Claims, 3 Drawing Sheets

(56) References Cited

U.S. PATENT DOCUMENTS

2008/0267128 A1* 10/2008 Bennett et al. ............... 370/331
2009/0047947 A1* 2/2009 Giaretta et al. ............ 455/432.1

OTHER PUBLICATIONS

3rd Generation Partnership Project; Technical Specification Group Services and System Aspects; Single Radio Voice Call Continuity (SRVCC) enhancements; Stage 2 (Release 10), 3GPP Standard; 3GPP TR 23.856, Sep. 19, 2010 3rd Generation Partnership Project (3GPP), Mobile Competence Centre ; 650, route des Lucioles ; F-06921 Sophia-Antipolis Cedex ; France, Nr:V10.0.0, pp. 1-80.

3rd Generation Partnership Project; Technical Specification Group Services and System Aspects; IP Multimedia Subsystem (IMS); Stage 2 (Release 10), 3GPP Standard; 3GPP TS 23.228, Jun. 10, 2010 3rd Generation Partnership Project (3GPP), Mobile Competence Centre ; 650, route des Lucioles ; F-06921 Sophia-Antipolis Cedex ; France, Nr:V10.1.0, pp. 1-267.

3rd Generation Partnership Project; Technical Specification Group Services and System Aspects; Study on enhancements to IMS border functions for Interconnection of IMS based Services; (Release 9), 3GPP Standard; 3GPP TR 23.848, Apr. 30, 2010, 3rd Generation Partnership Project (3GPP), Mobile Competence Centre ; 650, route des Lucioles ; F-06921 Sophia-Antipolis Cedex ; France, Nr:V0.9.0, pp. 1-32.

3rd Generation Partnership Project; Technical Specification Group Services and System Aspects; Voice Call Continuity (VCC) between Circuit Switched (CS) and IP Multimedia Subsystems (IMS); Stage 2 (Release 7), 3GPP Standard; 3GPP TR 23.206 Dec., 2007, 3rd Generation Partnership Project (3GPP), Mobile Competence Centre ; 650, route des Lucioles ; F-06921 Sophia-Antipolis Cedex ; France, Nr:V0.9.0, pp. 1-36.

European Patent Office, International Search Report in International Patent Application No. PCT/EP2011/002777 (Oct. 21, 2011).

European Patent Office, Extended European Search Report in European Patent Application No. 10 00 6283 (Mar. 15, 2011).

* cited by examiner

METHOD FOR USAGE OF VPLMN INFRASTRUCTURE BY AN HPLMN TO TERMINATE AN IMS SESSION SET UP FOR A ROAMING USER

CROSS-REFERENCE TO RELATED APPLICATIONS

This application is a U.S. National Phase application under 35 U.S.C. §371 of International Application No. PCT/EP2011/002777, filed on Jun. 7, 2011, and claims benefit to U.S. Provisional Patent Application No. 61/355,898, filed on Jun. 17, 2010, and European Patent Application No. EP 10006283.5, filed on Jun. 17, 2010. The International Application was published in English on Dec. 22, 2011 as WO 2011/157366 A1 under PCT Article 21(2).

FIELD

The present invention relates to communication systems. More particularly, and not by way of limitation, the invention is directed to a method for providing a roaming functionality related to an Internet Protocol Multimedia Subsystem (IMS) session, wherein a User Equipment (UE) is associated to a Home Public Land Mobile Network (HPLMN) and wherein the User Equipment (UE) roams in a Visited Public Land Mobile Network (VPLMN). Furthermore, the invention relates to a Visited Public Land Mobile Network (VPLMN) for providing a roaming functionality related to an Internet Protocol Multimedia Subsystem (IMS) session. Additionally, the invention relates to a Unit providing a Roaming Border Control Function (RBCF) in a Visited Public Land Mobile Network (VPLMN).

BACKGROUND

The IP Multimedia Subsystem (IMS), as defined by the Third Generation Partnership Project (3GPP), merges telephony and Internet technology by providing an all-IP based architecture for the telecommunications industry. The IMS is based on the Session Initiation Protocol (SIP) and makes use of the protocols defined within the Internet Engineering Task Force (IETF). The system offers a network of servers and databases that assist a user agent with the task of establishing and managing sessions.

Various 3GPP standards describe the architecture for IMS roaming in mobile networks. Hereby the infrastructure is split into entities within the Visited Public Land Mobile Network (VPLMN) such as Radio Access, Packet Core Network, Policy and Charging Rules Function (PCRF) of the VPLMN, IP Multimedia Subsystem (IMS), Proxy Call Session Control Function (P-CSCF) and entities within the Home Public Land Mobile Network (HPLMN) such as (IP Multimedia Subsystem (IMS)—Home Subscriber Server (HSS), Policy and Charging Rules Function (PCRF) of the HPLMN, Interrogating/Serving Call Session Control Function (I/S-CSCF), IP Multimedia Subsystem (IMS) Application Servers (e.g. application server which provides the MMTEL service for VoIP).

Regarding roaming functionality, the standards define that the user plane (RTP/RTCP VoIP traffic) might be routed to the HPLMN (home routing) or to the target network (local break out) (cf. 3GPP TR 23.228 Annex M). Additionally, the standards define methods to anchor the media within VPLMN and apply a local PS to CS handover for an inbound roaming user without impact on the HPLMN service domain or the remote user (cf. 3GPP TR 23.856).

The session set-up of a roaming user towards the remote end (so-called mobile originated situation) might be processed involving so-called Home Routing or involving so-called Local Break Out.

Home Routing means that the IP Multimedia Subsystem (IMS) signalling and the associated user plane is routed from the VPLMN via the HPLMN IP Multimedia Subsystem (IMS) domain. The HPLMN applies standard functionalities to terminate the session towards the target User Equipment (UE) (UE B-party) within its own access network or foreign networks (interconnection). The use of Home Routing results in inefficient routing of the user plane with increased resource consumption (IP networks, equipment) and IP transmission delays which jeopardises the quality for e.g. VoIP and Video sessions.

Local Break Out according to 3GPP TR 23.228 Annex M means that the IP Multimedia Subsystem (IMS) signalling is routed from the VPLMN via the HPLMN IP Multimedia Subsystem (IMS) domain towards the remote User Equipment (UE) (UE B-party) within its own or foreign networks, whereas the user plan is directly routed between IP addresses/ports of the VPLMN and the target network. The use of Local Break Out is not applicable if the called user is served by a legacy Circuit Switched (CS) network. Furthermore, the use of Local Break Out results in the challenge that the target network or a transit network between the VPLMN or the HPLMN on the one side and target networks on the other side receives signalling and user plane independently from different networks. This causes problems related to:

correlation, security (as it is not evident whether the incoming user plane is really associated with the incoming signalling)

accounting between the terminating network and the other involved networks (as it is unclear whether the terminating network will receive fees from the network which provides the signalling or from the network which provides the user plane), accounting between VPLMN and HPLMN (as the VPLMN, even though being aware about the target IP address to which it routes the user plane, can not apply the target IP address as criteria for accounting the target country/network (CC, NDC) as applied for legacy CS roaming), quality insurance between the multiple networks (HPLMN, VPLMN, target network, transit networks), as well as local number portability (as the local numbering schema and/or the portability status at remote side might be unknown to the HPLMN).

Similar problems arise when a HPLMN IMS domain terminates an incoming media session towards a roaming user (so-called mobile terminating situation).

Sending the signalling (SIP INVITE) from HPLMN Serving-Call State Control Function (S-CSCF) directly to VPLMN Proxy-Call State Control Function (P-CSCF) based on the Proxy-Call State Control Function (P-CSCF) IP address with user identity provided by the SIP INVITE request line and the media from HPLMN Media Gateway (MGW) to VPLMN Media Gateway (MGW) based on the IP address of the Media Gateway (MGW) associated to the Proxy-Call State Control Function (P-CSCF) results in independent IP routing for SIP signalling and media which does not allow routing decisions within transit networks according to the SIP INVITE request line, but allows to apply IP routing only based on the Proxy-Call State Control Function (P-CSCF) IP address. This means that signalling data and media data are routed independent from each other. Transit networks can not apply routing and accounting for, e.g., a VoIP or Video session by taking into account associated SIP and media streams, but will provide IP routing only, which means that they can apply IP peering only, which is different from inter-connection for media sessions.

SUMMARY

In an embodiment, the present invention provides a method for providing a roaming functionality related to an Internet Protocol Multimedia Subsystem (IMS) session. A first User Equipment (UE A) is associated to a Home Public Land Mobile Network (HPLMN). The first UE roams in a Visited Public Land Mobile Network (VPLMN). The Home Public Land Mobile Network (HPLMN) includes a first IMS domain. The VPLMN includes a second IMS domain. The VPLMN includes a Roaming Border Control Function (RBCF). A session set-up of an IMS session requires the handling of control signaling and the establishment of a user plane path. A session set-up request originates from the roaming first UE towards a second UE, the second UE being attached to a target network. The method includes: transmitting, by the second IMS domain, a session set-up request control signaling to the first IMS domain; transmitting, by the first IMS domain, the session set-up request control signaling in a forward direction to the RBCF; and handling, by the second IMS domain, the user plane path and the associated control signaling to terminate the session set-up. Local break out of media is applied for the roaming first UE. The RBCF provides a linking of signaling received via a loop through the first IMS domain in the HPLMN with media anchored due to the local break out in the second IMS domain in the VPLMN.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a method and a network that allows for an enhanced roaming possibility when using a User Equipment (UE) using Internet Protocol Multimedia Subsystem (IMS) session for communication.

In an embodiment, the present invention provides a method for providing a roaming functionality related to an Internet Protocol Multimedia Subsystem (IMS) session, wherein a first User Equipment (UE A) is associated to a Home Public Land Mobile Network (HPLMN) and wherein the first User Equipment (UE A) roams in a Visited Public Land Mobile Network (VPLMN), wherein the Home Public Land Mobile Network (HPLMN) comprises a first Internet Protocol Multimedia Subsystem (IMS) domain, wherein the Visited Public Land Mobile Network (VPLMN) comprises a second Internet Protocol Multimedia Subsystem (IMS) domain, and wherein the Visited Public Land Mobile Network (VPLMN) comprises a Roaming Border Control Function (RBCF), wherein in case of a session set-up request originating from the first User Equipment (UE A) (mobile originating case) the method comprises the steps of:

the second Internet Protocol Multimedia Subsystem (IMS) domain transmitting a session set-up request to the first Internet Protocol Multimedia Subsystem (IMS) domain, and the first Internet Protocol Multimedia Subsystem (IMS) domain transmitting a session set-up request to the Roaming Border Control Function (RBCF).

According to the present invention, it is thereby advantageously possible to allows for the HPLMN to apply Local Break Out for its roaming user by using the infrastructure (i.e. the Roaming Border Control Function (RBCF) of the VPLMN to terminate the session set-up. As a result the method advantageously allows:

an optimised media path for VoIP sessions, Video sessions, or the like, a minimal number of media gateways and transcodings for user plane, Routing based on local, national MNP/ENUM information of visited country, the usage of Local Interconnection, the use of Inter-Operator accounting principles for inbound roaming equal for CS/GSM and PS/Internet Protocol Multimedia Subsystem (IMS), a seamless inter-operator accounting for roaming even in case of Single Radio Voice Call Continuity (SRVCC) (i.e. the handover from a Packet Switched (PS) functionality to a Circuit Switched (CS) functionality), the use of Inter-Operator accounting principles for interconnection equal to legacy Interconnection, Full service control by the HPLMN IMS Domain.

According to the present invention, it is preferred that a local break out of media is performed with the Roaming Border Control Function (RBCF) reassigning signalling control to the given media, which is anchored in VPLMN due to local break out, after signalling has been send via a loop through the HPLMN IMS domain.

It is furthermore preferred according to the present invention that the Roaming Border Control Function (RBCF) applies an offline charging functionality.

According to still a further embodiment of the present invention, it is preferred that the media path is directly routed via a Visited Public Land Mobile Network (VPLMN) Media Gateway serving the first User Equipment (UE A) and the Visited Public Land Mobile Network (VPLMN) Media Gateway towards the second User Equipment (UE B).

In an embodiment, the present invention provides a method for providing a roaming functionality related to an Internet Protocol Multimedia Subsystem (IMS) session, wherein a first User Equipment (UE A) is associated to a Home Public Land Mobile Network (HPLMN) and wherein the first User Equipment (UE A) roams in a Visited Public Land Mobile Network (VPLMN), wherein the Home Public Land Mobile Network (HPLMN) comprises a first Internet Protocol Multimedia Subsystem (IMS) domain, wherein the Visited Public Land Mobile Network (VPLMN) comprises a second Internet Protocol Multimedia Subsystem (IMS) domain, and wherein the Visited Public Land Mobile Network (VPLMN) comprises a Roaming Border Control Function (RBCF), wherein a session set-up of an Internet Protocol Multimedia Subsystem (IMS) session requires the handling of control signaling and the establishment of a user plane path, wherein in case of a session set-up request originating from the roaming first User Equipment (UE A) (mobile originating case) towards a second User Equipment (UE B), the second User Equipment (UE B) being attached to a target network, the method comprises the steps of:

the second Internet Protocol Multimedia Subsystem (IMS) domain transmitting a session set-up request control signaling to the first Internet Protocol Multimedia Subsystem (IMS) domain, the first Internet Protocol Multimedia Subsystem (IMS) domain transmitting the session set-up request control signaling in forward direction to the Roaming Border Control Function (RBCF) of the second Internet Protocol Multimedia Subsystem (IMS) domain, and wherein the second Internet Protocol Multimedia Subsystem (IMS) domain is used to handle the user plane path and the associated control signaling to terminate the session set-up, whereby, since local break out of the media shall be applied for the roaming first User Equipment (UE A), the Roaming Boarder Control Function (RBCF) provides a linking of the signaling received via the loop through the first Internet Protocol Multimedia Subsystem (IMS) domain in the Home Public Land Mobile Network (PLMN)

with the media anchored due to the local break out in the second Internet Protocol Multimedia Subsystem (IMS) domain in the Visited Public Land Mobile Network (PLMN).

According to the present invention, the further session set-up towards any remote side can be based on an association between the control signalling and media which are send together towards the next IMS entity, whereby this entity might be any IBCF/I-BGF (PS interconnection to other IMS network),
MGCF/MGW (CS interconnection to other CS network) or
P-CSCF/A-BGF (serving a second User Equipment (UE B) attached to the given VPLMN)

of the second Internet Protocol Multimedia Subsystem (IMS) domain.

Thereby, it is advantageously possible that the further handling of the session set-up for the roaming first User Equipment (UE A) can be treated like a session set-up of a non roaming local user of the second Internet Protocol Multimedia Subsystem (IMS) domain. Thereby, it is advantageously possible that the media (voice, etc.) is not routed in an isolated manner directly to the Internet Protocol target address (so-called naked Internet Protocol stream without signalling) but that the RBCF node provides the context between the media and the signalling and sends a correlated signalling together with media information to the next network node. The RBCF node provides a management functionality regarding the further session setup such that, despite realizing a local break out, the second Internet Protocol Multimedia Subsystem (IMS) domain in the Visited Public Land Mobile Network (VPLMN) is able:

to serve the visiting first User Equipment in the same manner as an own (non-visiting and non-roaming) user, and to route the session of the visiting first User Equipment to the target having a binding between signalling and media.

In an embodiment, the present invention provides a method for providing a roaming functionality related to an Internet Protocol Multimedia Subsystem (IMS) session, wherein a second User Equipment (UE B) is associated to a Home Public Land Mobile Network (HPLMN) and wherein the second User Equipment (UE B) roams in a Visited Public Land Mobile Network (VPLMN), wherein the Home Public Land Mobile Network (HPLMN) comprises a third Internet Protocol Multimedia Subsystem (IMS) domain, wherein the Visited Public Land Mobile Network (VPLMN) comprises a fourth Internet Protocol Multimedia Subsystem (IMS) domain, and wherein the Visited Public Land Mobile Network (VPLMN) comprises a Roaming Border Control Function (RBCF), wherein in case of a session set-up request terminating at the second User Equipment (UE B) (mobile terminating case) the method comprises the steps of:

the Roaming Border Control Function (RBCF) transmitting a session set-up request to the third Internet Protocol Multimedia Subsystem (IMS) domain, and the first Internet Protocol Multimedia Subsystem (IMS) domain transmitting a session set-up request to the fourth Internet Protocol Multimedia Subsystem (IMS) domain.

According to the present invention, it is thereby advantageously possible to route a terminating media session (e.g. VoIP, Video) from Home Public Land Mobile Network (HPLMN) to Visited Public Land Mobile Network (VPLMN) via service aware transit networks which apply routing and accounting decisions according to the SIP INVITE request line. Thereby, it is even possible to use legacy Circuit Switched (CS) networks as transit networks for the routing of the media session on the inter-connection path.

It is preferred according to the present invention that the Roaming Border Control Function (RBCF) receives a session set-up request by an Interconnect Border Control Function (IBGF), this session set-up request being routed via at least one transfer entity.

According to the present invention, both the mobile originating case of a session establishment, and
the mobile terminating case of a session establishment is considered. In order to distinguish between these two cases, in the context of the present invention, it is referred to the first User Equipment for the mobile originating case and to the second User Equipment for the mobile terminating case. In the context of the present invention, a roaming situation is assumed, either of the first User Equipment or of the second User Equipment or of both User Equipments. For both cases (mobile originating and mobile terminating) the Home Public Land Mobile Network (HPLMN) and the Visited Public Land Mobile Network (VPLMN) can be equipped with an Internet Protocol Multimedia Subsystem (IMS) domain. In order to distinguish between these two cases, in the context of the present invention, it is referred to:

the first Internet Protocol Multimedia Subsystem (IMS) domain for the Home Public Land Mobile Network (HPLMN) of the first User Equipment (for the mobile originating case), the second Internet Protocol Multimedia Subsystem (IMS) domain for the Visited Public Land Mobile Network (VPLMN) of the first User Equipment (for the mobile originating case), the third Internet Protocol Multimedia Subsystem (IMS) domain for the Home Public Land Mobile Network (HPLMN) of the second User Equipment (for the mobile terminating case), the fourth Internet Protocol Multimedia Subsystem (IMS) domain for the Visited Public Land Mobile Network (VPLMN) of the second User Equipment (for the mobile terminating case).

In an embodiment, the present invention provides a method for providing a roaming functionality related to an Internet Protocol Multimedia Subsystem (IMS) session, wherein a second User Equipment (UE B) is associated to a Home Public Land Mobile Network (HPLMN) and wherein the second User Equipment (UE B) roams in a Visited Public Land Mobile Network (VPLMN), wherein the Home Public Land Mobile Network (HPLMN) comprises a third Internet Protocol Multimedia Subsystem (IMS) domain, wherein the Visited Public Land Mobile Network (VPLMN) comprises a fourth Internet Protocol Multimedia Subsystem (IMS) domain, and wherein the Visited Public Land Mobile Network (VPLMN) comprises a Roaming Border Control Function (RBCF), wherein a session set-up of an Internet Protocol Multimedia Subsystem (IMS) session requires the handling of control signaling and the establishment of a user plane path, wherein in case of a session set-up request terminating at the roaming second User Equipment (UE B) (mobile terminating case) from a first User Equipment (UE A), the first User Equipment (UE A) being attached to an originating network, the method comprises the steps of:

the third Internet Protocol Multimedia Subsystem (IMS) domain transmitting a session set-up request control signaling to the Roaming Border Control Function (RBCF) of the Visited Public Land Mobile Network (VPLMN) allowing to set-up the media path to the VPLMN, the Roaming Border Control Function (RBCF) transmitting a session set-up request control signaling to the third Internet Protocol Multimedia Subsystem (IMS) domain, and wherein the fourth Internet Protocol Multimedia Subsystem (IMS) domain is used to handle the user plane path and the associated control signaling to terminate the session set-up, whereby, since local break out of the media shall be applied for the roaming second User Equipment (UE B), the Roaming Boarder Control Function (RBCF) provides a linking of the signaling received from the third Internet Protocol Multimedia Subsystem (IMS) domain in the Home Public Land Mobile Network (HPLMN)

with the media send to the fourth Internet Protocol Multimedia Subsystem (IMS) domain, where the media of the second User Equipment (UE B) is anchored due to local break out.

The present invention also relates to a Core Network, namely a Network of a Visited Public Land Mobile Network (VPLMN) for providing a roaming functionality related to an Internet Protocol Multimedia Subsystem (IMS) session, wherein a first User Equipment (UE A) is associated to a Home Public Land Mobile Network (HPLMN) and wherein first the User Equipment (UE A) roams in the Visited Public Land Mobile Network (VPLMN), wherein the Home Public Land Mobile Network (HPLMN) comprises a first Internet Protocol Multimedia Subsystem (IMS) domain, wherein the Visited Public Land Mobile Network (VPLMN) comprises a second Internet Protocol Multimedia Subsystem (IMS) domain, and wherein the Visited Public Land Mobile Network (VPLMN) comprises a Roaming Border Control Function (RBCF), wherein in case of a session set-up request originating from the first User Equipment (UE A) (mobile originating case) the Visited Public Land Mobile Network (VPLMN) is configured for:

the transmission of a session set-up request from the second Internet Protocol Multimedia Subsystem (IMS) domain to the first Internet Protocol Multimedia Subsystem (IMS) domain, and the transmission of a session set-up request from the first Internet Protocol Multimedia Subsystem (IMS) domain to the Roaming Border Control Function (RBCF).

Furthermore, the present invention relates to a Core Network, namely a Network of a Visited Public Land Mobile Network (VPLMN) for providing a roaming functionality related to an Internet Protocol Multimedia Subsystem (IMS) session, wherein a second User Equipment (UE B) is associated to a Home Public Land Mobile Network (HPLMN) and wherein the second User Equipment (UE B) roams in the Visited Public Land Mobile Network (VPLMN), wherein the Home Public Land Mobile Network (HPLMN) comprises a third Internet Protocol Multimedia Subsystem (IMS) domain, wherein the Visited Public Land Mobile Network (VPLMN) comprises a fourth Internet Protocol Multimedia Subsystem (IMS) domain, and wherein the Visited Public Land Mobile Network (VPLMN) comprises a Roaming Border Control Function (RBCF), wherein in case of a session set-up request terminating at the second User Equipment (UE B) (mobile terminating case) the Visited Public Land Mobile Network (VPLMN) is configured for:

the transmission of a session set-up request from the Roaming Border Control Function (RBCF) to the third Internet Protocol Multimedia Subsystem (IMS) domain, and the transmission of a session set-up request from the first Internet Protocol Multimedia Subsystem (IMS) domain to the fourth Internet Protocol Multimedia Subsystem (IMS) domain.

The present invention furthermore also relates to a Core Network, namely a Network of a Visited Public Land Mobile Network (VPLMN) for providing a roaming functionality related to an Internet Protocol Multimedia Subsystem (IMS) session, wherein a first User Equipment (UE A) is associated to a Home Public Land Mobile Network (HPLMN) and wherein first the User Equipment (UE A) roams in the Visited Public Land Mobile Network (VPLMN), wherein the Home Public Land Mobile Network (HPLMN) comprises a first Internet Protocol Multimedia Subsystem (IMS) domain, wherein the Visited Public Land Mobile Network (VPLMN) comprises a second Internet Protocol Multimedia Subsystem (IMS) domain, and wherein the Visited Public Land Mobile Network (VPLMN) comprises a Roaming Border Control Function (RBCF), wherein a session set-up of an Internet Protocol Multimedia Subsystem (IMS) session requires the handling of control signaling and the establishment of a user plane path, wherein in case of a session set-up request originating from the roaming first User Equipment (UE A) (mobile originating case) towards a second User Equipment (UE B), the second User Equipment (UE B) being attached to a target network, wherein the Visited Public Land Mobile Network (VPLMN) is configured for:

the transmission of a session set-up request control signaling from the second Internet Protocol Multimedia Subsystem (IMS) domain to the first Internet Protocol Multimedia Subsystem (IMS) domain, the transmission of a session set-up request control signaling from the first Internet Protocol Multimedia Subsystem (IMS) domain back to the Roaming Border Control Function (RBCF) of the second Internet Protocol Multimedia Subsystem (IMS) domain, and wherein the second Internet Protocol Multimedia Subsystem (IMS) domain is used to handle the user plane path and the associated control signaling to terminate the session set-up, whereby, since local break out of the media shall be applied for the roaming first User Equipment (UE A), the Roaming Boarder Control Function (RBCF) provides a linking of the signaling received via the loop through the first Internet Protocol Multimedia Subsystem (IMS) domain in the Home Public Land Mobile Network (PLMN)

with the media anchored due to the local break out in the second Internet Protocol Multimedia Subsystem (IMS) domain in the Visited Public Land Mobile Network (PLMN).

Furthermore, the present invention relates to a Core Network, namely a Network of a Visited Public Land Mobile Network (VPLMN) for providing a roaming functionality related to an Internet Protocol Multimedia Subsystem (IMS) session, wherein a second User Equipment (UE B) is associated to a Home Public Land Mobile Network (HPLMN) and wherein the second User Equipment (UE B) roams in the Visited Public Land Mobile Network (VPLMN), wherein the Home Public Land Mobile Network (HPLMN) comprises a third Internet Protocol Multimedia Subsystem (IMS) domain, wherein the Visited Public Land Mobile Network (VPLMN) comprises a fourth Internet Protocol Multimedia Subsystem (IMS) domain, and wherein the Visited Public Land Mobile Network (VPLMN) comprises a Roaming Border Control Function (RBCF), wherein a session set-up of an Internet Protocol Multimedia Subsystem (IMS) session requires the handling of control signaling and the establishment of a user plane path, wherein in case of a session set-up request terminating at the roaming second User Equipment (UE B) (mobile terminating case) from a first User Equipment (UE A), the first User Equipment (UE A) being attached to an originating network, the Visited Public Land Mobile Network (VPLMN) is configured for:

the transmission of a session set-up request control signaling from third Internet Protocol Multimedia Subsystem (IMS) domain to the Roaming Border Control Function (RBCF) of the Visited Public Land Mobile Network (VPLMN) allowing to set-up the media path to the VPLMN, the transmission of a session set-up request control signaling from the Roaming Border Control Function (RBCF) to the third Internet Protocol Multimedia Subsystem (IMS) domain, and wherein the fourth Internet Protocol Multimedia Subsystem (IMS) domain is used to handle the user plane path and the associated control signaling to terminate the session set-up, whereby, since local break out of the media shall be applied for the roaming second User Equipment (UE B), the Roaming Boarder Control Function (RBCF) provides a linking of the signaling received from the third Internet Protocol Multimedia Subsystem (IMS) domain in the Home Public Land Mobile Network (HPLMN)

with the media send to the fourth Internet Protocol Multimedia Subsystem (IMS) domain, where the media of the second User Equipment (UE B) is anchored due to local break out.

The present invention also relates to a Unit providing a Roaming Border Control Function (RBCF) in an inventive Core Network or Visited Public Land Mobile Network (VPLMN).

Additionally, the present invention relates to a program comprising a computer readable program code for controlling a Unit providing an Roaming Border Control Function (RBCF) in a Visited Public Land Mobile Network (VPLMN) according to the present invention.

According to the present invention, the roaming functionality related to an Internet Protocol Multimedia Subsystem (IMS) session is provided as follows: If a roaming user (i.e. an initiating or first User Equipment (UE A) in a mobile originating situation) sets up a media session, the VPLMN Proxy-Call State Control Function (P-CSCF), i.e. the second Internet Protocol Multimedia Subsystem (IMS) domain, will forward the session set-up request (INVITE) towards the HPLMN IMS domain (I/S-CSCF), i.e. to the first Internet Protocol Multimedia Subsystem (IMS) domain. The HPLMN IMS domain will apply home services within own application servers and decide to proceed with session set-up towards the remote end.

The new method allows now for the HPLMN to address the further session set-up towards a Roaming Border Control Function (RBCF) within the VPLMN. This is a specific new functionality within the VPLMN which provides capabilities beyond those applied by legacy Boarder Gateways.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

According to the present invention, a Home Public Land Mobile Network (HPLMN) can easily terminate an IMS media session of its IMS user (UE A) roaming in a foreign VPLMN towards the remote end via infrastructure of the VPLMN thereby using the capabilities of a Roaming Border Control Function (RBCF) within the VPLMN.

Preferably, the Roaming Border Control Function (RBCF) provides access control to ensure allowance for use of its capabilities according to the rights assigned for a given HPLMN. Furthermore, the Roaming Border Control Function (RBCF) provides data base queries for a session set-up requested by HPLMN to analyse the destination and apply local fixed number portability and/or mobile number portability as well as local numbering rules to determine the destination network.

Furthermore, the Roaming Border Control Function (RBCF) supports termination of media session set-up towards VPLMN's PS or CS access network or towards other CS/PS networks via VPLMN's inter-connection infrastructure.

It is preferred according to the present invention that the VPLMN infrastructure includes an Internet Protocol Multimedia Subsystem (IMS) domain, i.e. including Proxy-Call State Control Function (P-CSCF) and associated GWs, and that Roaming Border Control Function (RBCF) supports direct connectivity of the media path via the shortest route between the VPLMN access gateways serving the calling party (UE A) (PDN-GW, IMS MGW (also referred to as A-BGF or A-SBC) and the VPLMN's GW towards the remote party (UE B), which might be either a media gateway to VPLMN's own PS or CS access or an interconnection media gateway towards other CS or PS networks.

According to the present invention, it is preferred that the inventive functionality within the VPLMN Proxy-Call State Control Function (P-CSCF) controls which treatment is applied for originating IMS traffic of a roaming user (UE A). Thereby, the Proxy-Call State Control Function (P-CSCF) will verify the media description including IP addresses/ports (IMS SDP) forwarded back and forth between the calling party (UE A) and the remote side to decide on allowances for different functionality modes of the roaming functionality, which might be characterised e.g. as follows:

Local Break Out with Roaming Border Control Function (RBCF): B-Side SDP for media session restricted to IP addresses of VPLMN GWs, i.e. traffic will be terminated according to the inventive method, Home Routing: B-Side SDP for media session restricted to IP addresses of HPLMN GWs, i.e. standardised method will be applied to terminate such the traffic, Local Break Out with Direct Routing: B-Side SDP for media session might provide any target IP address, i.e. standardised method will be applied to terminate the traffic. According to the present invention, these functionality modes of the roaming functionality are dynamically negotiated between VPLMN P-CSCF (provides allowed modes) and HPLMN S-CSCF (provides required modes) within e.g. IMS registration procedures, whereby VPLMN and HPLMN entities need to agree on a commonly allowed, required and supported set of modes.

According to the present invention, the P-CSCF is able to forward a security token towards the Home Public Land Mobile Network (HPLMN), the HPLMN relays the security token towards the VPLMN Roaming Border Control Function (RBCF), and the VPLMN RBCF verifies the token to restrict access to its capabilities for: (1) traffic originated within own network (own P-CSCF/MGW) only and/or (2) traffic forwarded by an HPLMN which got an allowance to use the described method from the VPLMN.

According to a preferred embodiment of the present invention, the Roaming Border Control Function (RBCF) provides accounting information which covers parameters such as:

Serving Network (VPLMN),
Served Network (HPLMN),
Served Party (roaming A-party subscribed to HPLMN),
Media (Voice, Video, . . . ),
Time,
Session Duration,
Called Party (Might be any sip/tel uri (incl. short code) from TO Header),
Destination (E.164 (<CC><NDC>) or domain (xxx@yyy . cc)) for defining the destination to which media is forwarded by VPLMN)

which allow to apply inter-operator accounting based on e.g. the information to which target network the user plane is forwarded (according to the "Destination" parameter).

According to the present invention, it is furthermore preferred that the VPLMN P-CSCF provides the address of the Roaming Border Control Function (RBCF) to the HPLMN IMS domain (e.g. via a new header P-RBCF for SIP INVITE) to allow usage of VPLMN RBCF for terminating the session.

Alternatively, it is furthermore preferred that the RBCF address is preconfigured within the IMS domain of the Home Public Land Mobile Network (HPLMN) according to configuration data pre-shared between VPLMN and HPLMN operator.

A further preferred embodiment of the present invention relates to the VPLMN P-CSCF and the VPLMN RBCF providing accounting information which is correlated by the VPLMN's billing system to support inter-operator accounting and verification of conformance to roaming agreements between VPLMN and Home Public Land Mobile Network (HPLMN).

Furthermore, it is preferred that the RBCF functionality is co-allocated within other entities, e.g. within an IMS P-CSCF or IMS IBGF.

According to another embodiment of the present invention, the VPLMN RBCF functionality is used to serve terminating calls towards roaming users.

Furthermore, it is preferred that the HPLMN IMS domain serving a roaming user invokes a session set-up for incoming media sessions via transit networks towards the VPLMN Roaming Border Control Function (RBCF) and thereby providing additional information which can be used by the VPLMN Roaming Border Control Function (RBCF) to forward the incoming media session to the VPLMN P-CSCF which serves the roaming user (UE B).

Additionally, it is preferred according to the present invention that the VPLMN RBCF routes the signalling for the incoming media session via the HPLMN IMS domain which forwards the signalling to the VPLMN P-CSCF where the user is registered. Thereby signalling is routed via the HPLMN IMS domain acting as a signalling anchor which can control terminating services for it's user.

Furthermore, it is preferred according to the present invention that the HPLMN IMS domain provides a HPLMN-ID and a Session-ID to the VPLMN Roaming Border Control Function (RBCF) (preferably with the called party number on call set-up via any CS/PS transit network), whereby the HPLMN-ID can be used by the VPLMN RBCF to forward the session set-up to the HPLMN IMS domain entities and the Session-ID can be used by the HPLMN IMS domain entities to correlate the incoming session set-up with the initial session set-up from the A party and to proceed with this session set-up towards VPLMN P-CSCF where the roaming user (B party) is registered.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
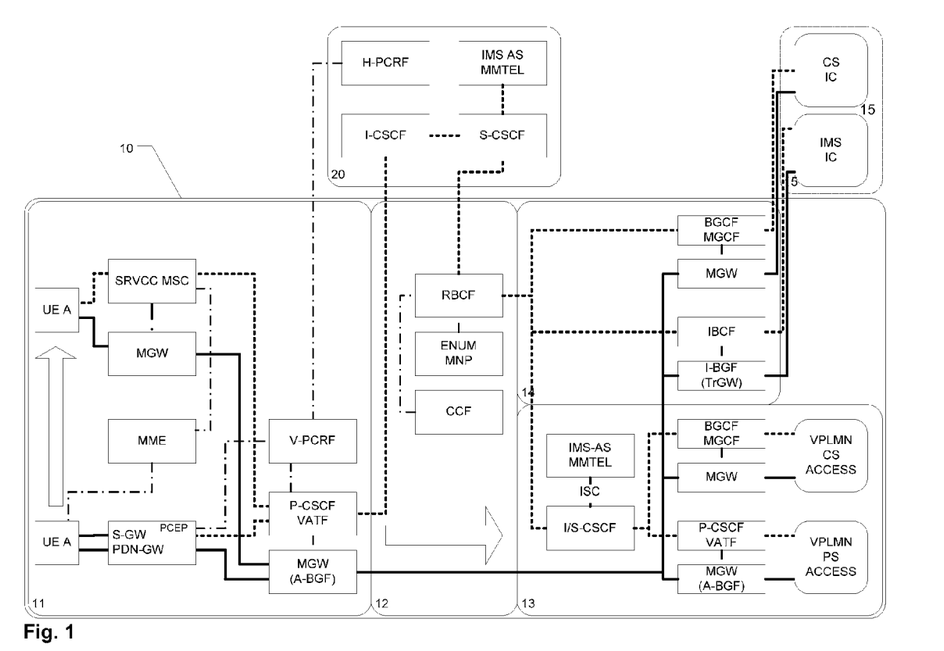
FIG. 1 schematically illustrates the network architecture representing the mobile originating situation.

In FIG. 1, the network architecture representing the mobile originating situation, i.e. for outgoing calls (MOC), is schematically shown.

A Visited Public Land Mobile Network (VPLMN) access domain 11 serves the roaming user, hereinafter also called User Equipment (UE A). The Visited Public Land Mobile Network (VPLMN) access domain comprises the S-GW, PDN-GW, a Media Gateway (MGW) A-BGF (Border Gateway Function, i.e. the Border Gateway Function for UE A), the Proxy-Call State Control Function (P-CSCF), a Visited PCRF, a Mobility Management Entity (MME), another Media Gateway (MGW) (related to the Circuit Switched (CS) domain and a SRVCC Mobile Switching Center (MSC).

The Home Public Land Mobile Network (HPLMN) 20 provides home services for its user (i.e. User Equipment (UE) A in the mobile originating situation). The Home Public Land Mobile Network (HPLMN) comprises a Home PCRF and a HPLMN IMS domain or Internet Protocol Multimedia Subsystem (IMS) service domain, comprising Interrogating-Call State Control Function (I-CSCF), Serving-Call State Control Function (S-CSCF) as well as an Internet Protocol Multimedia Subsystem (IMS) Application Server (IMS AS MMTEL)

A VPLMN Roaming Gateway domain 12 providing access for the HPLMN 20 to the usage of VPLMN infrastructure for the termination of media sessions. The Visited Public Land Mobile Network (VPLMN) Roaming Gateway domain 12 comprises the Roaming Border Control Function (RBCF) as well as an ENUM/MNP function and a CCF function.

A VPLMN PS/CS access domain 13 serves the remote user. The Visited Public Land Mobile Network (VPLMN) Packet Switched (PS)/Circuit Switched (CS) access domain 13 comprises a BGCF/MGCF function, a Proxy-Call State Control Function (P-CSCF) as well as associated Media Gateways (MGW).

A VPLMN inter-connection domain 14 provides interconnection towards other CS/PS networks.

An (upwards directing) arrow in the Visited Public Land Mobile Network (VPLMN) Access Network 11 represents a SRVCC handover. The upper part of the Visited Public Land Mobile Network (VPLMN) Access Network 11 corresponds to a Circuit Switched (CS) Access Network and the lower part of the VPLMN Access Network 11 corresponds to a Packet Switched (PS) Access Network. The other arrows in FIG. 1 correspond to the flow of the session set-up messages. The dashed lines correspond to the control signalling or control plane signalling and the drawn through lines correspond to the user plane or user plane path. The dot-dashed lines correspond to interfaces like Sy, Gx, S1-MME or S9 between the entities of the network.

Beside the logical architecture, the inventive approach allows the integration of various logical functions within one physical entity. For example, the Roaming Border Control Function (RBCF) might be co-allocated with other Internet Protocol Multimedia Subsystem (IMS) entities (e.g. P-CSCF, I/S-CSCF, IBCF or the like).

Figure 2:
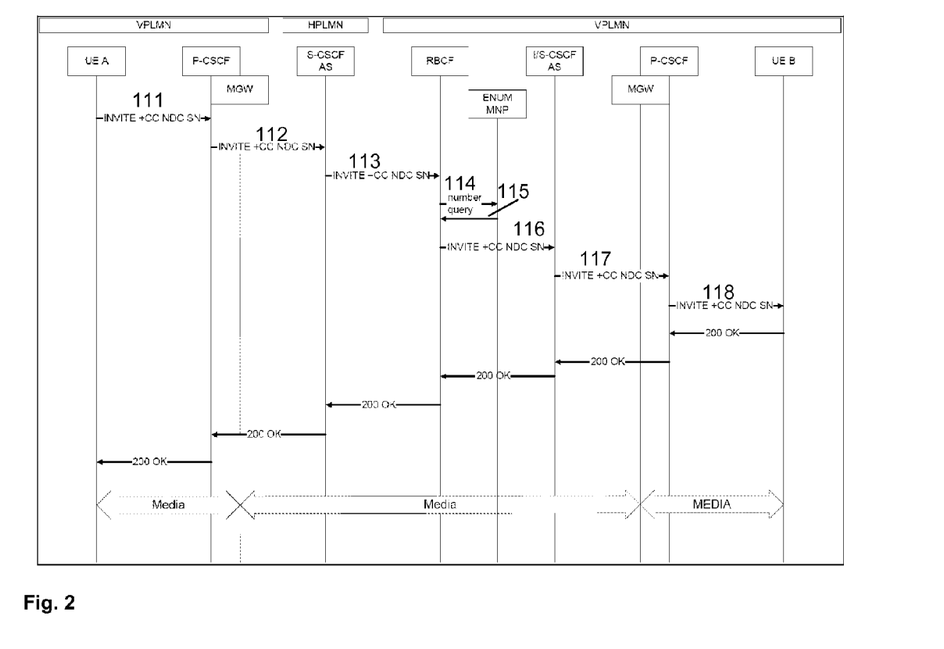
FIG. 2 schematically illustrates a communication diagram related to the mobile originating situation.

In FIG. 2, a communication diagram related to the session set-up in the mobile originating situation is schematically shown.

The communication diagram in FIG. 2 assumes that a first User Equipment (UE A) is registered in the Home Public Land Mobile Network (HPLMN) 20 and roams in the Visited Public Land Mobile Network (VPLMN) 10. The first to eighth messages 111 to 118 referred to in FIG. 2 only relate to the mobile originated situation.

In a first step, involving a first message 111 "INVITE +CC NDC SN", the first User Equipment (UE A) sends session set-up message (SIP INVITE) to the Proxy-Call State Control Function (P-CSCF) of the Visited Public Land Mobile Network (VPLMN) 10. This corresponds, e.g., to the first User Equipment (UE A) dialling any number to set up a voice call. In a second step, involving a second message 112 "INVITE +CC NDC SN", the session set-up message is forwarded from the Proxy-Call State Control Function (P-CSCF) of the Visited Public Land Mobile Network (VPLMN) 10 to the Interrogating/Serving-Call State Control Function (I/S-CSCF) of the Home Public Land Mobile Network (HPLMN) 20. Thereby, the Proxy-Call State Control Function (P-CSCF) of the Visited Public Land Mobile Network (VPLMN) 10 might add an indication that "LBO (Local Break Out) with Roaming Border Control Function (RBCF)" should be applied. Furthermore, the Proxy-Call State Control Function (P-CSCF) might add an address of the Roaming Border Control Function (RBCF). Furthermore, the Proxy-Call State Control Function (P-CSCF) might add a security token (that is later to be validated by the Roaming Border Control Function (RBCF)). The Home Public Land Mobile Network (HPLMN) IMS domain (i.e. the Serving-Call State Control Function (S-CSCF) and/or the Application Server (AS)) applies an originating service.

In a third step and due to the origin of the call, the Home Public Land Mobile Network (HPLMN) Serving-Call State Control Function (S-CSCF) forwards a third the set-up message 113 "INVITE +CC NDC SN" to the Roaming Border Control Function (RBCF) of the VPLMN 10. It is preferred according to the present invention that thereby, a pre-configured Roaming Border Control Function (RBCF) address or an Roaming Border Control Function (RBCF) is used (or an address provided by the P-CSCF with the original INVITE set-up message). The invite address used in the second message 112 is replaced in the third message 113 to define the final destination that is used for routing and charging respective accounting. The VPLMN RBCF applies security checks including the allowance of the HPLMN to use its capabilities. Furthermore, the VPLMN RBCF applies number analysis including data base queries via e.g. ENUM to derive the destination network thereby taking into account local number portability information. This is represented in FIG. 2 by means of a fourth and a fifth message 114, 115 "number query" between the Roaming Border Control Function (RBCF) and the ENUM/MNP function.

In a sixth step, involving a sixth message 116, the VPLMN RBCF forwards the set-up message "INVITE +CC NDC SN" to the destination according to the result of the number analysis. Thereby the destination might be one of the following four cases:

the own IMS (of the VPLMN): the sixth message 116 is send to the IMS domain of the VPLMN serving the called user (via I-CSCF to S-CSCF), i.e. the second User Equipment (UE B); only this case is represented in FIG. 2;

the own Circuit Switched (CS) network (of the VPLMN): the sixth message is send via VPLMN's BGCF to VPLMN's MGCF which applies inter-working to CS network and forwards set-up towards the remote party (second User Equipment (UE B));

a foreign IMS network: the sixth message is send via VPLMN IBCF towards IMS domain of the destination network, whereby several transit networks might be used between VPLMN and transit network;

a foreign Circuit Switched (CS) network: the sixth message 116 is send via BGCF to MGCF which applies inter-working to CS and forwards set-up towards destination network, whereby several transit networks might be used between the VPLMN and the transit network.

In the represented first case (destination is the own IMS domain of the Visited Public Land Mobile Network (VPLMN)), by means of a seventh message 117 (in a seventh step), the session set-up message is forwarded from the Interrogating-Call State Control Function (I-CSCF) or Serving-Call State Control Function (S-CSCF) (of the Visited Public Land Mobile Network (VPLMN)) to the Proxy-Call State Control Function (P-CSCF). In an eighth step, involving an eighth message 118, the set-up message is forwarded to the second User Equipment (UE B).

By means of a plurality of "200 OK" messages, the response from remote side (or second User Equipment (UE B)) is send back via VPLMN RBCF to HPLMN S-CSCF to VPLMN P-CSCF to the calling first User Equipment (UE A). Thereby RBCF and P-CSCF verify the media description including the IP address/the port to verify that the media is routed only between VPLMN's access gateways serving the first party or first User Equipment (UE A) (PDN-GW, IMS MGW (also referred to as A-BGF or A-SBC) and the VPLMN's GW towards the second User Equipment (UE B), which might be either a media gateway to VPLMN's own PS or CS access or an interconnection media gateway towards other CS or PS networks (as described before).

Session set-up proceeds according to standard IMS sequence. Thereby the VPLMN RBCF and VPLMN P-CSCF continue to verify signalling including media description to ensure correct application of media routing according to the roaming agreement between VPLMN and HPLMN.

Figure 3:
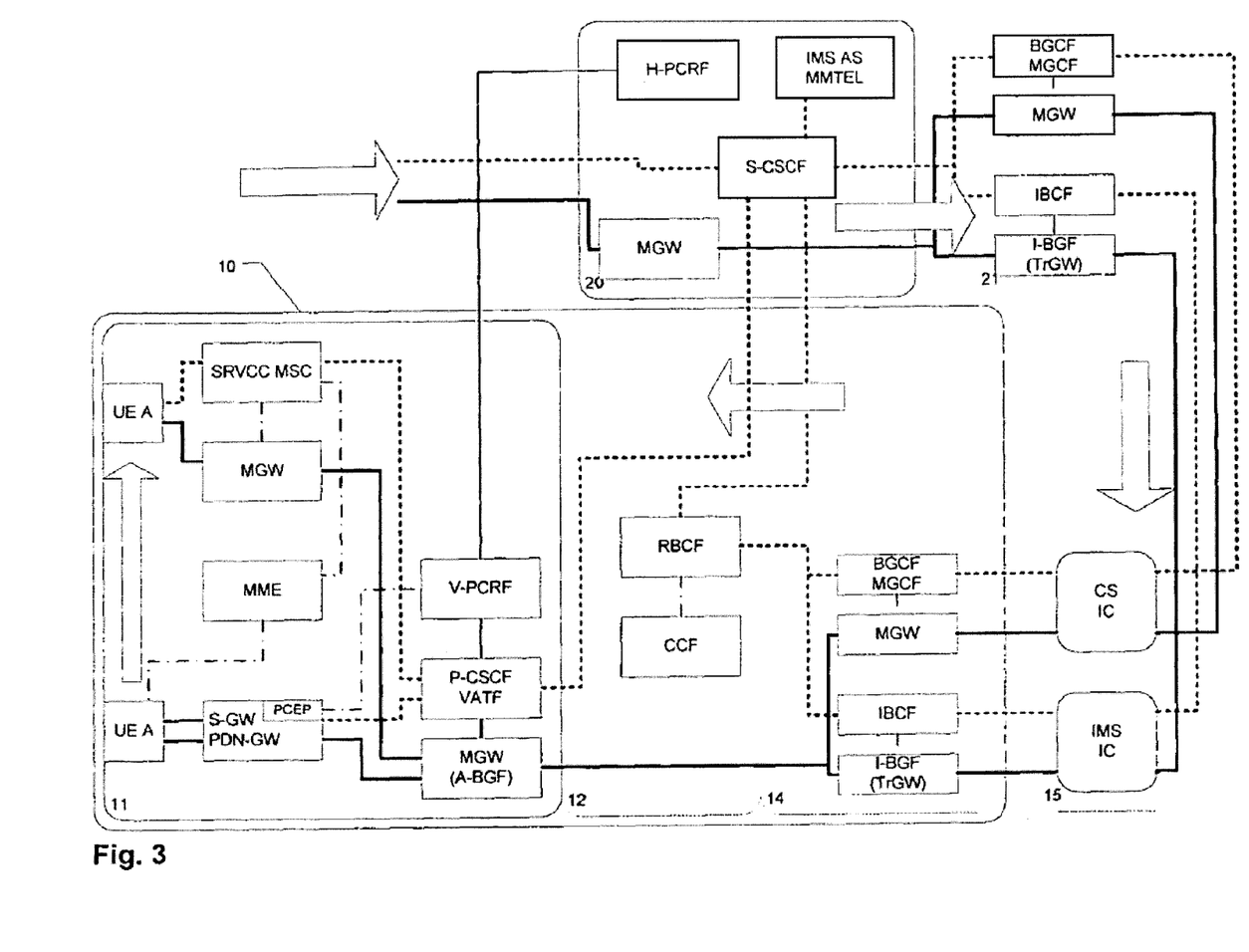
FIG. 3 schematically illustrates the network architecture representing the mobile terminating situation.

In FIG. 3, the network architecture representing the mobile terminating situation is schematically shown.

In the mobile terminating situation, the HPLMN IMS domain sets up a media session towards a roaming user (hereinafter also called second User Equipment (UE B)) as a media session addressed by SIP signalling towards the VPLMN Roaming Border Control Function (RBCF) (telephone number or SIP Uniform Resource Identifier (URI) providing CC NDC or domain name of the VPLMN). Thereby, the address of the called user (or second User Equipment (UE B)) is provided via an appropriate new or existing parameter (e.g. TO header or additional called party number (which would be used as an address parameter in case of a Circuit Switched (CS) interconnection). This allows the usage of any CS or PS Interconnection network between the HPLMN 20 and the VPLMN 10. In case of CS interconnection, the address of the Roaming Border Control Function (RBCF) is given by the CalledNumber parameter, whereby the called party is indicated by either a CalledNumber suffix or another appropriate ISDN user part (ISUP) parameter (e.g. an additional called party). The identity of the called user (or second User Equipment (UE B)) might be also given by an indirect addressing based on a Mobile Station Roaming Number (MSRN) provided by the VPLMN to the HPLMN according to GSM procedures for terminating calls.

The transit networks will be aware of associated signalling and media streams and can apply routing decisions and accounting decisions based on SIP parameters (INVITE request line). The VPLMN Roaming Border Control Function (RBCF) will analyse the incoming media session, modify the incoming request (e.g. by setting the called party identity within SIP INVITE request line) and route to the P-CSCF to which the called user is registered. According to the present invention, it is preferred for this routing that the VPLMN Roaming Border Control Function (RBCF) route the session via HPLMN S-CSCF to VPLMN P-CSCF This allows the HPLMN IMS domain a better control for the terminating session, since the SIP signalling might have been interworked to ISDN user part (ISUP) signalling with restricted signalling capabilities within the inter-connection networks.

FIG. 3 depicts an example for the overall logical architecture for terminating calls (MTC, mobile terminating call). The Architecture consists out of:
- a HPLMN 20 comprising an IMS service domain serving the roaming user (i.e. the second User Equipment (UE B)) and processing the incoming call;
- a HPLMN PC/CS inter-connection domain 21 which provides connectivity to/from CS/PS interconnection networks,
- one or a plurality of CS/PS interconnection networks 15,
- a VPLMN PS/CS inter-connection domain 14 which provides connectivity to/from CS/PS interconnection networks,
- a VPLMN Roaming GW domain 12 providing access for the HPLMN to usage of VPLMN infrastructure for termination of media sessions towards the roaming user, and
- a VPLMN PS/CS access domain 11 serving the roaming user (i.e. the second User Equipment (UE B)).

An (upwards directing) arrow in the Visited Public Land Mobile Network (VPLMN) Access Network represents a SRVCC handover. The upper part of the Visited Public Land Mobile Network (VPLMN) Access Network 11 corresponds to a Circuit Switched (CS) Access Network and the lower part of the VPLMN Access Network 11 corresponds to a Packet Switched (PS) Access Network. The other arrows in FIG. 3 correspond to the flow of the session set-up messages. The dashed lines correspond to the control signalling or control plane signalling and the drawn through lines correspond to the user plane or user plane path. The dot-dashed lines correspond to interfaces like Sy, Gx, S1-MME or S9 between the entities of the network.

Figure 4:
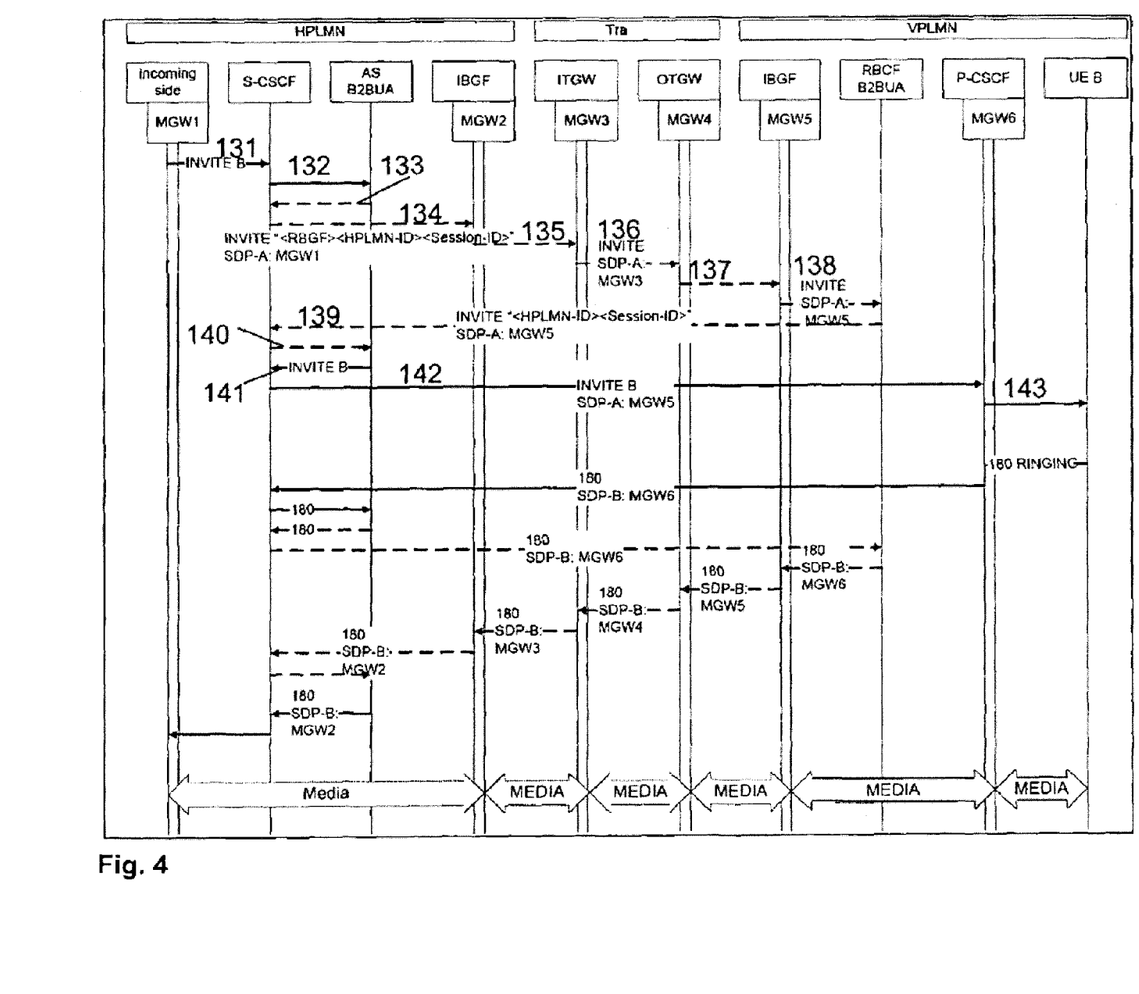
FIG. 4 schematically illustrates a communication diagram related to the mobile terminating situation.

In FIG. 4, a communication diagram related to the mobile terminating situation of the session set-up is schematically shown.

The communication diagram in FIG. 4 assumes that a second User Equipment (UE B) is registered in the Home Public Land Mobile Network (HPLMN) 20 and roams in the Visited Public Land Mobile Network (VPLMN) 10, i.e. the second User Equipment (UE B) is registered via VPLMN Proxy-Call State Control Function (P-CSCF) within his HPLMN IMS domain. The first to thirteenth messages 131 to 143 referred to in FIG. 4 only relate to the mobile terminating situation.

In a first step, the set-up message "INVITE B" 131 is received by the HPLMN (through a Media Gateway (MGW1)) and serves the incoming session for the roaming user B, i.e. the second User Equipment (UE B).

In a second step, involving a second and third message 132, 133 an HPLMN Application Server (AS) is invoked which anchors the session. This means that a second session is generated from the perspective of the Serving-Call State Control Function (S-CSCF) of the Home Public Land Mobile Network (HPLMN). The association of the two sessions is performed by the Application Server (AS).

In a third step, involving a fourth, fifth, sixth, seventh and eighth message 134, 135, 136, 137, 138, the session set-up is performed using a plurality of messages through HPLMN IBGF via transit GWs (Media Gateways MGW2, MGW3, MGW4 and MGW5), VPLMN IBGF to the VPLMN Roaming Border Control Function (RBCF) with address line <VPLMN RBCF><HPLMN ID><Session ID>. Hereby the <RBCF> address part provides <CC><NDC> to allow the transit Gateways to apply routing decisions based on the SIP layer. From the point of view of the transit networks, a media session from HPLMN IBGF to the VPLMN IBGF is set-up with an associated media path provided by the SIP SDP information. The Routing and the accounting is based on the <RBCF> part of the INVITE request line.

The Roaming Border Control Function (RBCF) uses the <HPLMN ID> to send a ninth signalling message 139 back towards HPLMN anchor, i.e. to the Serving-Call State Control Function (S-CSCF) of the Home Public Land Mobile Network (HPLMN). The IP address used to route the INVITE message is preferably derived from the <HPLMN ID>. The SIP protocol part of this IP signalling is transparent for the transit networks.

The HPLMN correlates, involving a tenth and eleventh message 140, 141, the incoming INVITE B set-up message 131 via the <Session ID> with the ongoing session set-up (i.e. the ninth message 139) and continues with session set-up to the second User Equipment (UE B) via VPLMN P-CSCF (by means of a twelfth message 142 where the second User Equipment (UE B) is registered. A thirteenth message 143 corresponds to the ringing at the second User Equipment (UE B).

The backward messages "180 SDP-B" are used by the VPLMN Roaming Border Control Function (RBCF) to address for routing the media content.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for providing a roaming functionality related to an Internet Protocol Multimedia Subsystem (IMS) session, wherein a first User Equipment (UE) is associated to a Home Public Land Mobile Network (HPLMN) and wherein the first UE roams in a Visited Public Land Mobile Network (VPLMN), wherein the Home Public Land Mobile Network (HPLMN) comprises a first IMS domain, wherein the VPLMN comprises a second IMS domain, and wherein the VPLMN comprises a Roaming Border Control Function (RBCF), wherein a session set-up of an IMS session requires the handling of control signaling and the establishment of a user plane path, wherein a session set-up request originates from the roaming first UE towards a second UE, the second UE being attached to a target network, the method comprising the steps of:

transmitting, by the second IMS domain, a session set-up request control signaling to the first IMS domain;
transmitting, by the first IMS domain, the session set-up request control signaling in a forward direction to the RBCF of the VPLMN; and
handling, by the second IMS domain, the user plane path and the associated control signaling to terminate the session set-up;
wherein local break out of media is applied for the roaming first UE; and
wherein the RBCF of the VPLMN provides a linking of signaling received via a loop through the first IMS domain in the HPLMN with media anchored due to the local break out in the second IMS domain in the VPLMN.

2. The method according to claim 1, wherein the RBCF applies an offline charging functionality.

3. The method according to claim 1, wherein the RBCF applies number analysis and portability functionalities to support further session set-up.

4. A method for providing a roaming functionality related to an Internet Protocol Multimedia Subsystem (IMS) session, wherein a first User Equipment (UE) is associated to a Home Public Land Mobile Network (HPLMN) and wherein the first UE roams in a Visited Public Land Mobile Network (VPLMN), wherein the HPLMN comprises a first IMS domain, wherein the VPLMN comprises a second IMS domain, and wherein the VPLMN comprises a Roaming Border Control Function (RBCF), wherein a session set-up of an IMS session requires the handling of control signaling and the establishment of a user plane path, wherein a session set-up request terminates at the roaming first UE from a second UE, the second UE being attached to an originating network, the method comprises the steps of:

transmitting, by the first IMS domain, a session set-up request control signaling to the RBCF of the VPLMN to set-up of a media path to the VPLMN;
transmitting, by the RBCF of the VPLMN, the session set-up request control signaling to the first IMS domain; and
handling, by the second IMS domain, the user plane path and the associated control signaling to terminate the session set-up;
wherein local break out of media is applied for the roaming first UE; and
wherein the RBCF of the VPLMN provides a linking of the signaling received from the first IMS domain in the HPLMN with media sent to the second IMS domain, where media of the first UE is anchored due to local break out.

5. The method according to claim 4, wherein the RBCF receives a session set-up request by an Interconnect Border Gateway Function (IBGF), the session set-up request being routed via at least one transfer entity.

6. A Visited Public Land Mobile Network (VPLMN) for providing a roaming functionality related to an Internet Protocol Multimedia Subsystem (IMS) session, wherein a first User Equipment (UE) is associated to a Home Public Land Mobile Network (HPLMN) and wherein the first UE roams in the VPLMN, wherein the HPLMN comprises a first IMS domain, wherein a session set-up of an IMS session requires the handling of control signaling and the establishment of a user plane path, wherein a session set-up request originates from a roaming first UE towards a second UE, the second UE being attached to a target network, the VPLMN comprising:

a plurality of network entities;
a second IMS domain; and
a Roaming Border Control Function (RBCF) node;
wherein the plurality of network entities of the VPLMN are configured for:
transmission of a session set-up request control signaling from the second IMS domain to the first IMS domain; and
transmission of the session set-up request control signaling from the first IMS domain in a forward direction to the RBCF node of the second IMS domain;
wherein the second IMS domain is configured to handle the user plane path and the associated control signaling to terminate the session set-up;
wherein local break out of media is to be applied for the roaming first UE; and
wherein the RBCF node is configured to provide a linking of signaling received via a loop through the first IMS domain in the HPLMN with media anchored due to the local break out in the second IMS domain in the VPLMN.

7. A Visited Public Land Mobile Network (VPLMN) for providing a roaming functionality related to an Internet Protocol Multimedia Subsystem (IMS) session, wherein a first User Equipment (UE) is associated to a Home Public Land Mobile Network (HPLMN) and wherein the first UE roams in theVPLMN, wherein the HPLMN comprises a first IMS domain, wherein a session set-up of an IMS session requires handling of control signaling and establishment of a user plane path, wherein a session set-up request terminates at the roaming first UE from a second UE, the second UE being attached to an originating network, the VPLMN comprising:
a plurality of network entities;
a second IMS domain; and
a Roaming Border Control Function (RBCF) node;
wherein the plurality of network entities of the VPLMN are configured for:
transmission of a session set-up request control signaling from the first IMS domain to the RBCF to set-up a media path to the VPLMN;
transmission of the session set-up request control signaling from the RBCF node to the first IMS domain, and
wherein the second IMS domain is configured to handle the user plane path and the associated control signaling to terminate the session set-up;
wherein local break out of media is to be applied for the roaming first UE;
wherein the RBCF node is configured to provide a linking of signaling received from the first IMS domain in the HPLMN with media sent to the second IMS domain, where media of the first UE is anchored due to local break out.

8. A non-transitory computer-readable medium, part of a Visited Public Land Mobile Network (VPLMN), having computer-executable instructions thereon for providing a roaming functionality related to an Internet Protocol Multimedia Subsystem (IMS) session, wherein a first User Equipment (UE-A) is associated to a Home Public Land Mobile Network (HPLMN) and wherein the first UE roams in the VPLMN, wherein the Home Public Land Mobile Network (HPLMN) comprises a first IMS domain, wherein the VPLMN comprises a second IMS domain, and wherein the VPLMN comprises a Roaming Border Control Function (RBCF), wherein a session set-up of an IMS session requires the handling of control signaling and the establishment of a user plane path, wherein a session set-up request originates from the roaming first UE towards a second UE, the second UE being attached to a target network, the computer-executable instructions, when executed by a processor, causing the following steps:
transmitting, by the second IMS domain, a session set-up request control signaling to the first IMS domain;
receiving a transmission of the session set-up request control signaling from the first IMS domain in a forward direction to the RBCF of the VPLMN; and
handling, by the second IMS domain, the user plane path and the associated control signaling to terminate the session set-up;
wherein local break out of media is applied for the roaming first UE; and
wherein the RBCF of the VPLMN provides a linking of signaling received via a loop through the first IMS domain in the HPLMN with media anchored due to the local break out in the second IMS domain in the VPLMN.

9. A non-transitory computer-readable medium, part of a Visited Public Land Mobile Network (VPLMN), having computer-executable instructions thereon for providing a roaming functionality related to an Internet Protocol Multimedia Subsystem (IMS) session, wherein a first User Equipment (UE) is associated to a Home Public Land Mobile Network (HPLMN) and wherein the first UE roams in the VPLMN, wherein the HPLMN comprises a first IMS domain, wherein the VPLMN comprises a second IMS domain, and wherein the VPLMN comprises a Roaming Border Control Function (RBCF), wherein a session set-up of an IMS session requires the handling of control signaling and the establishment of a user plane path, wherein a session set-up request terminates at the roaming first UE from a second UE, the second UE being attached to an originating network, the computer-executable instructions, when executed by a processor, causing the following steps:
receiving, by the RBCF of the VPLMN, a session set-up request control signaling from the first IMS domain to set-up of a media path to the VPLMN;
transmitting, by the RBCF of the VPLMN, the session set-up request control signaling to the first IMS domain; and
handling, by the second IMS domain, the user plane path and the associated control signaling to terminate the session set-up;
wherein local break out of media is applied for the roaming first UE; and
wherein the RBCF of the VPLMN provides a linking of the signaling received from the first IMS domain in the HPLMN with media sent to the second IMS domain, where media of the first UE is anchored due to local break out.

\* \* \* \* \*